United States Patent [19]
Tanaka

[11] Patent Number: 6,132,000
[45] Date of Patent: Oct. 17, 2000

[54] LOCK RELEASING STRUCTURE OF SEAT BACK

[75] Inventor: Shinji Tanaka, Kanagawa-ken, Japan

[73] Assignee: Ikeda Bussan Co., Ltd., Kanagawa-ken, Japan

[21] Appl. No.: 09/176,105

[22] Filed: Oct. 21, 1998

[30] Foreign Application Priority Data

Oct. 23, 1997 [JP] Japan ............................ 9-291212

[51] Int. Cl.$^7$ ............................................. B60N 2/02
[52] U.S. Cl. .................... 297/378.13; 297/378.1; 297/463.1; 296/65.17
[58] Field of Search .................. 297/378.12, 378.1, 297/378.13, 463.1; 296/65.17

[56] References Cited

U.S. PATENT DOCUMENTS 5,879,043  3/1999  Radue et al. .................. 297/378.13 X

FOREIGN PATENT DOCUMENTS 61-057436  3/1986  Japan .................. 297/378.13
6-33730    5/1994  Japan .

Primary Examiner—Laurie K. Cranmer
Attorney, Agent, or Firm—Nath & Associates; Gary M. Nath; Harold L. Novick

[57] ABSTRACT

A lock releasing mechanism of a seat back is provided with a seat back to be folded. A lock mechanism is provided inside the seat back and is one for the seat back to be locked. An escutcheon is mounted to the seat back and has an opening therethrough. A strap is connected with the lock mechanism, has a projection outside the seat back through the opening of the escutcheon, is folded on the end of the projection, and is one for the lock mechanism to be released by pulling up the projection. A supporting element is interposed in the folded strap and is provided in the opening of the escutcheon.

5 Claims, 4 Drawing Sheets

6,132,000

LOCK RELEASING STRUCTURE OF SEAT BACK

BACKGROUND OF THE INVENTION

1. Field of the Invention

The present invention relates to a lock releasing structure of a seat back to be folded forward that is applied to an automobile and the like.

2. Description of the Related Art

Some rear seats are constituted so that their seat backs is folded forward in order for a loading space behind the rear seat to communicate with a compartment space and in order to take luggage in and out of the loading space without getting off an automobile, or in order to enlarge the loading space. Such a seat back of the rear seat is supported by a locking mechanism to be fixed in a car body and be engaged with/removed from the locking mechanism. Moreover, an escutcheon having an opening is mounted on a top portion of the seat back, and an operation knob made of hard synthetic resin as operating means which is connected with the locking mechanism is projected through the opening of the escutcheon into the compartment space. By pulling up the operation knob, the lock mechanism is released so that the seat back can fold forward (as for similar technique to the operation knob, see Japanese Utility Model Application Laid-Open No. 6-33730). When the operation knob interferes with the seat back of a front seat or the like, rubbing occurs between the operation knob and the seat back because the operation knob is hard. The operation knob might damage durability of a surface material of the seat back.

SUMMARY OF THE INVENTION

A cloth-made strap is used in place of the knob. Although the strap is made of cloth, it has enough strength to be self-supported. Therefore, the state that the strap is projected through the opening of the escutcheon can be maintained.

However, the state that the strap is projected outside the seat back through the opening of the escutcheon is maintained to some degree due to the strength of the strap itself, but the opening of the escutcheon is not constituted so as to prevent the strap from falling. For this reason, if a hand touches the upper portion of the strap, the strap might fall into the opening unexpectedly. After the strap falls into the opening, it is necessary to remove the escutcheon to pull out the strap, so this work is very troublesome.

It is an object of the present invention to provide a lock releasing structure of a seat back for a strap to be prevented from falling into an opening of an escutcheon.

From a first aspect of the invention, there is provided a lock releasing structure of a seat back, which comprises: a seat back which is folded forward and has a top portion; a lock mechanism which is provided inside the seat back and is one for the seat back to be fixed thereby; an escutcheon which is mounted on the top portion of a seat back and has a cylinder-shaped opening; a strap which has an upper portion which is projected over the seat back through the opening of the escutcheon, an upper end of the upper portion, and a predetermined width, has a folded portion on the upper end, is connected with a lock mechanism in the seat back, and is one for the lock mechanism to be released by pulling up the upper portion for the seat back to be folded forward; and a supporting element which is provided in the opening of the escutcheon along a width-wise direction of the strap, is interposed in the folded strap, and faces the same direction as the strap in the pulling-up direction.

According to the invention from this aspect, since the supporting element provided in the opening of the escutcheon is interposed in the double-folded strap, at least the folded portion on the top end of the strap is caught by the supporting element so that the strap is prevented from falling into the opening. Moreover, although the supporting element is interposed in the folded strap, the strap can be pulled up to release the lock, so the releasing of the lock mechanism is not hindered.

In a preferable embodiment, the strap has a pulling-up operation area which has an upper and a lower end portion, the supporting element is between the upper and the lower end portion, and the upper and the lower end portion are sewn along the width-wise direction.

According to this embodiment, since the upper and the lower end portion of the pulling-up operation area with the supporting element intervening therebetween are sewn along the width-wise direction, the pulling-up operation area of the strap does not shift below the supporting element so that the upper portion of the strap is projected securely.

In a preferable embodiment, the supporting member has an upper and a lower end surface, one of the upper and the lower end surface is curved.

According to this embodiment, since one of the upper and the lower end surface of the supporting element is curved, the strap is not caught by the supporting element.

From a second aspect of the invention, there is provided a lock releasing mechanism of a seat back, which comprises: a seat back which is to be folded; a lock mechanism which is provided inside the seat back and is one for the seat back to be locked thereby; an escutcheon which is mounted to the seat back and has an opening therethrough; a strap which is connected with the lock mechanism in the seat back, has a projection outside the seat back through the opening in the escutcheon, is folded on the end of the projection, and is one for the lock mechanism to be released by pulling up the projection thereof; and a supporting element which is interposed in the folded strap and is provided in the opening of the escutcheon.

DETAILED DESCRIPTION OF THE PREFERRED EMBODIMENTS

There will be detailed below the preferred embodiment of the present invention with reference to FIGS. 1 through 6.

Figure 1:
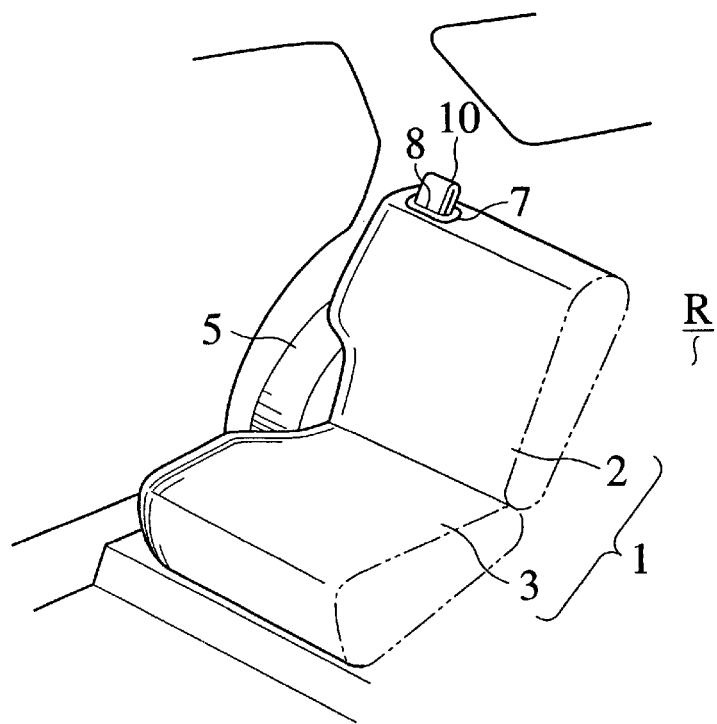
FIG. 1 is a perspective view showing a seat back according to embodiment of the present invention in a standing state.
Figure 2:
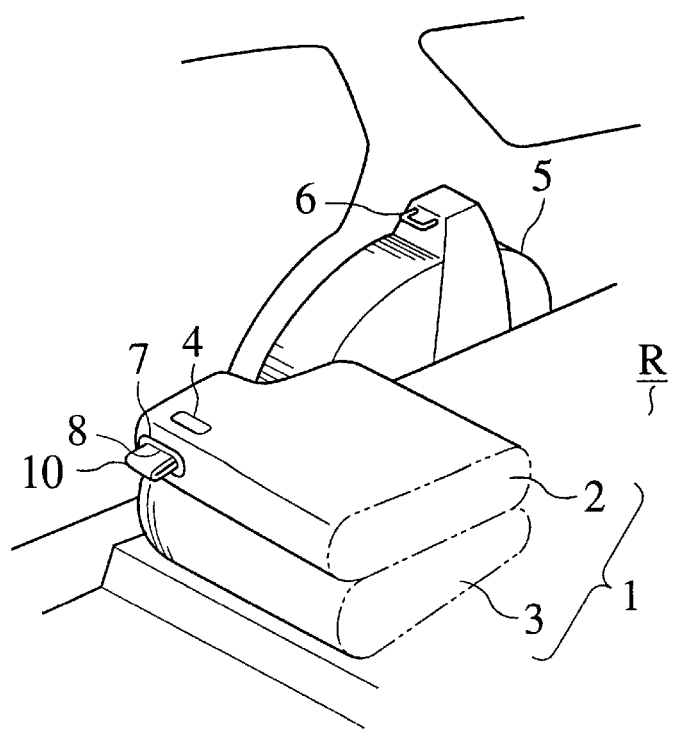
FIG. 2 is a perspective view showing the seat back in a forwardly folded state.
Figure 6:
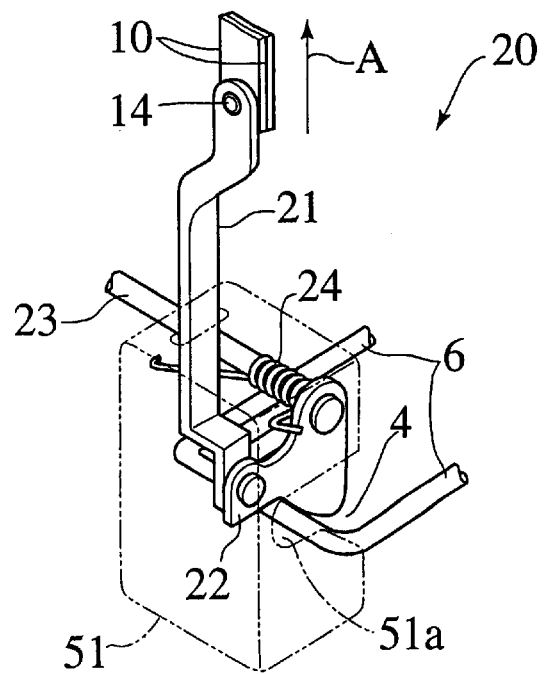
FIG. 6 is a perspective view of a locking mechanism.

As shown in FIGS. 1 and 2, a rear seat 1 is composed of a seat back 2 and a seat cushion 3. The seat back 2 is to be folded forward because a loading space R is enlarged or the like. A lock hole 4 shown in FIG. 2 is formed in a rear surface of a portion projected to the outside of the seat back 2, and a lock mechanism 20 shown in FIG. 6 is positioned in the lock hole 4 in the seat back 2.

A striker 6 is provided on a wheel house inner 5 projected to the side of a compartment space on the rear side of the rear seat 1. When the seat back 2 is raised, the striker 6 enters the lock hole 4 to be engaged with the lock mechanism 20 shown in FIG. 6 therein.

Figure 3:
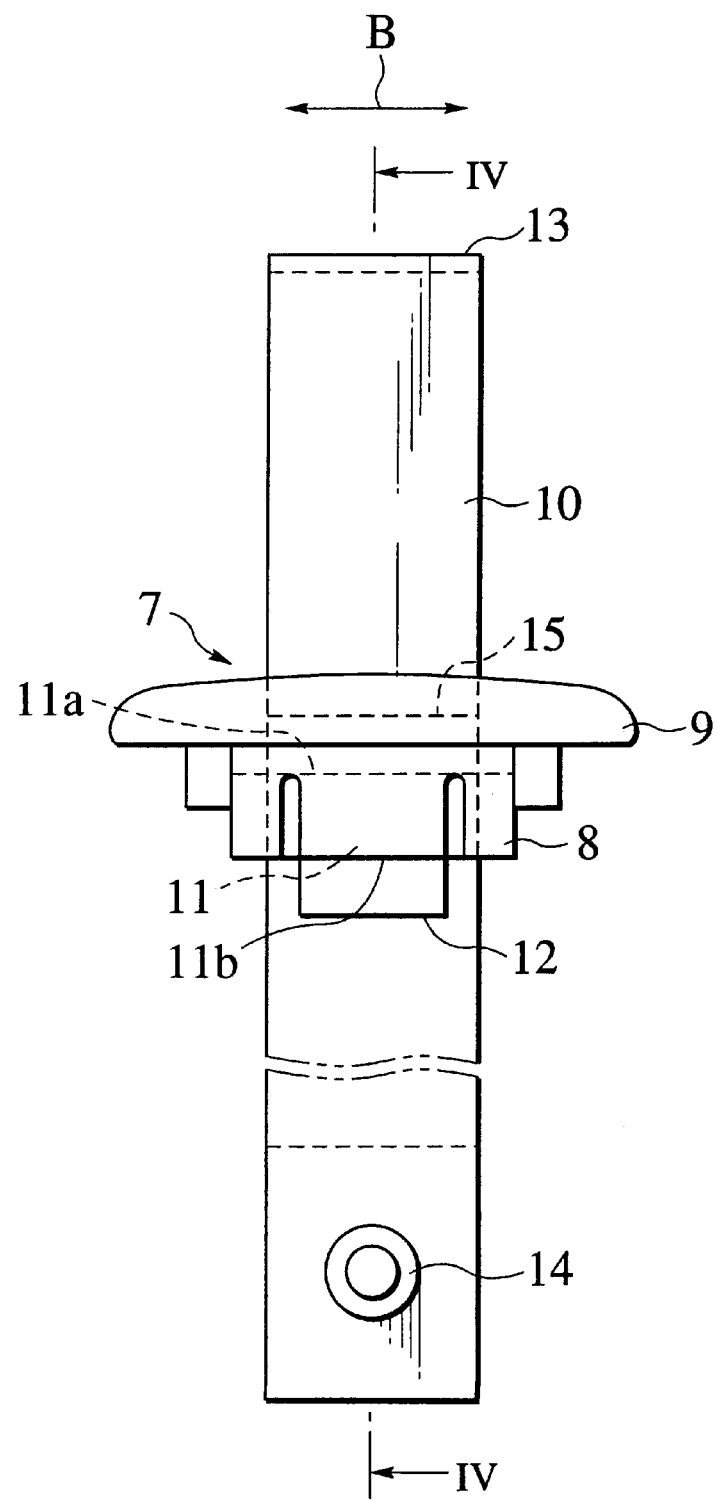
FIG. 3 is a side view showing an escutcheon and a strap.
Figure 4:
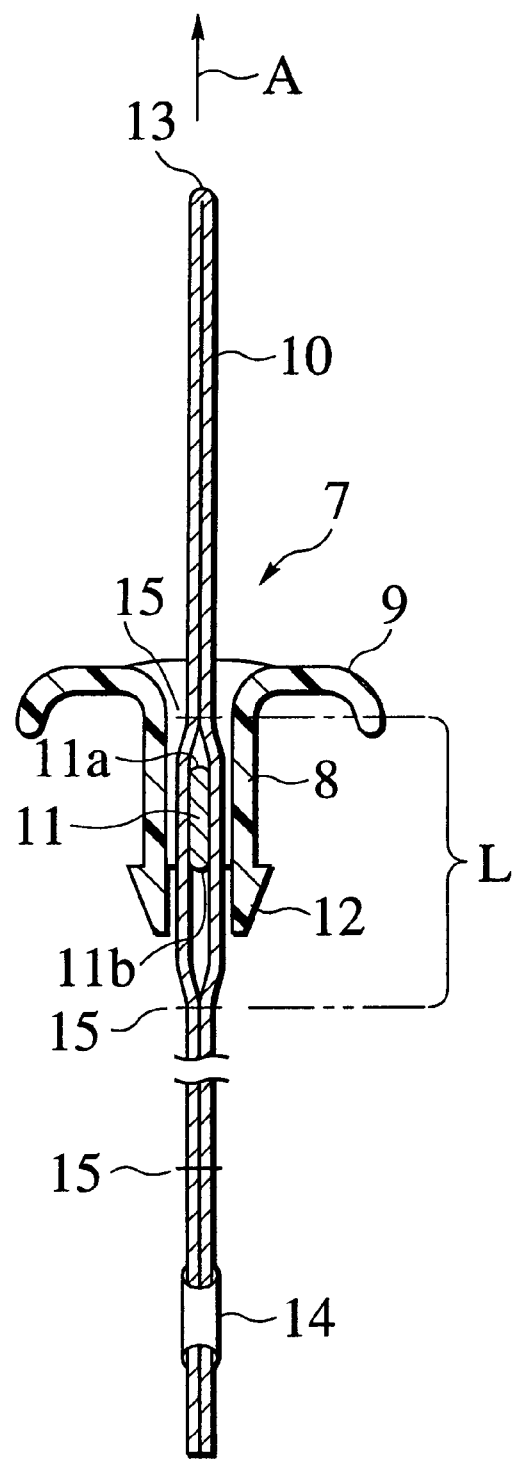
FIG. 4 is a sectional view taken along a line IV–IV of FIG. 3.
Figure 5:
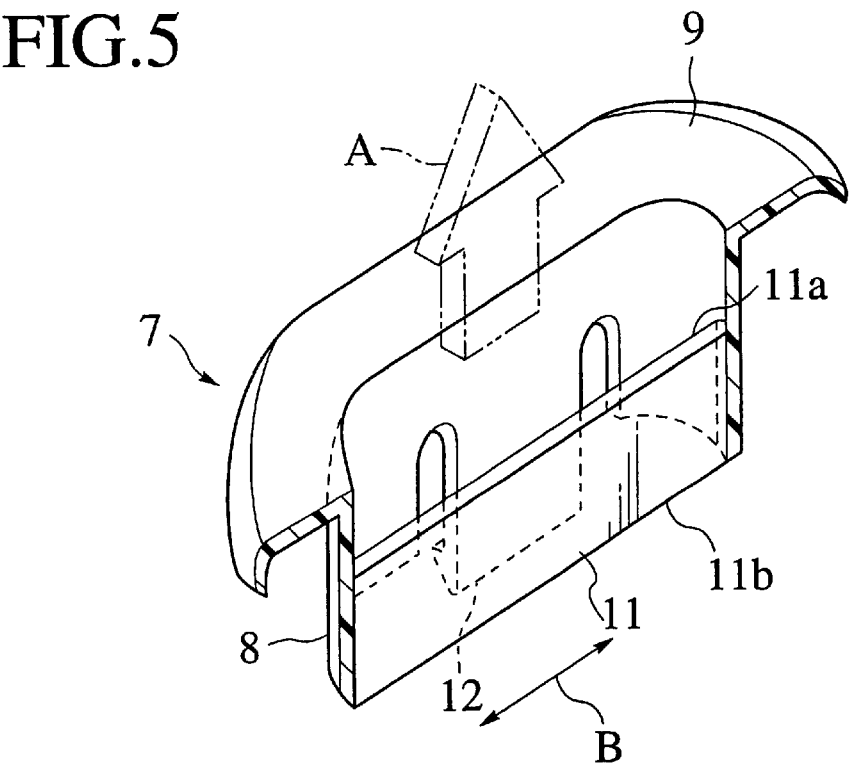
FIG. 5 is a partial section of the escutcheon.

An escutcheon 7 is mounted on the top portion of the seat back 2. As shown in FIGS. 3 and 4, the escutcheon 7 is composed of a cylinder-shaped opening 8 having an elliptical section along a width-wise direction of the car, and a peripheral flange 9 formed around the opening 8. Further, a pair of hooks 12 are formed at the lower end of the opening 8 in the escutcheon 7, and the hooks 12 are engaged with the seat back 2.

A strap 10 has a folded portion 13, namely, a double-folded structure on its upper end, and a supporting element 11 is interposed in the folded strap 10. A lock metal fittings 14 are provided on the lower end of the strap 10, and the lock metal fittings 14 are connected with the lock mechanism 20.

A sewn portion 15 is provided on an upper end portion and a lower end portion of a pulling-up operation area L along the width-wise direction of the strap 10. The supporting element 11 is between the upper and the lower end portion of the area L. Therefore, the supporting element 11 is not beyond the pulling-up operation area L. The strap 10 is previously mounted to the supporting element 11 of the escutcheon 7, and the strap 10 and the escutcheon 7 are simultaneously mounted to the seat back 2.

The upper portion of the strap 10 as a projection is projected over(outside) the seat back through the opening 8 of the escutcheon 7. The lock mechanism 20 is released by pulling the upper portion of the strap 10 upward (direction A) so that the seat back 2 can be folded forward.

In addition, the supporting element 11 faces the same direction as the strap 10 in the pulling-up direction A of the strap 10 (see FIG. 4) within the opening 8. Moreover, the supporting element 11 is provided between one end and the other end on the inner surface of the opening 8 in a width-wise direction B (see FIGS. 3 and 5) of the strap 10, namely the supporting element 11 is provided across the opening 8. An upper end surface 11a and a lower end surface 11b of the supporting element 11 are curved.

As shown in FIG. 6, the lock mechanism 20 is composed of an operation pole 21 which is fixed to the lock metal fittings 14, a latch member 22 which is connected with the operation pole 21 and is engaged with the striker 6, a rotating shaft 23 which supports the latch member 22 and is fixed to the seat back 2, and a spring member 24 which is wound around the rotating shaft 23 and is fixed to the latch member 22.

The latch member 22 is fitted in the operation pole 21 with a play, and is rotatable with respect to the rotating shaft 23. Moreover, the engaged portion with the striker 6 is formed in sector-shaped centered on the rotating shaft 23.

The spring member 24 exerts an elastic force on latch member 22 and the latch member 22 is rotated in a direction where the latch member 22 is engaged with the striker 6.

A box 51 is provided inside the seat back 2, and is provided with a fitting groove 51a in which striker 6 is to be entered and which communicates with the lock hole 4. The fitting groove 51a cooperates with the latch member 22, and thus the striker 6 is kept in the fitting groove 51a.

When the operation pole 21 is pulled up in the direction A in the drawing, the latch member 22 is rotated in a clockwise direction about the rotating shaft 23 against the elastic force of the spring member 24 to be removed from the striker 6. When the seat back 2 is pushed forward, the striker 6 comes out of the fitting groove 51a of the box 51.

According to the embodiment, the supporting element 11 which is provided in the opening 8 of the escutcheon 7 is interposed in the double-folded strap 10, and the sewn portion 15 is provided on the upper end portion and the lower end portion of the pulling-up operation area L. For this reason, the pulling-up operation area L of the strap 10 does not shift below the supporting element 11, and the upper portion of the strap 10 is securely kept projected. Therefore, even if a hand touches the upper portion of the strap 10, the strap 10 does not fall into the opening 8 of the escutcheon 7, so the lock mechanism can be released securely by the strap 10.

Further, since the upper end surface 11a and the lower end surface 11b of the supporting element 11 are curved, the motion of the strap 10 is not prevented by the supporting element 11.

The aforementioned embodiment described the example that the sewn portion 15 is provided on the upper end portion and the lower end portion of the pulling-up operation area L of the strap 10. However, if the sewn portion 15 is not provided, at least the folded portion 13 on the upper end of the strap 10 is caught by the supporting element 11, so the strap 10 does not fall into the opening 8 of the escutcheon 7 completely.

What is claimed is:

1. A lock releasing structure of a seat back, comprising:

a seat back having a top portion, the seat back to be folded forward;

a lock mechanism provided inside the seat back, the lock mechanism for the seat back to be fixed thereby;

an escutcheon mounted on the top portion of the seat back, the escutcheon having a cylinder-shaped opening;

a folded strap having an upper portion, an upper end of the upper portion, and a predetermined width, the strap having a fold part on the upper end, the upper portion projected over the seat back through the opening of the escutcheon, the strap connected with the lock mechanism in the seat back, the strap for the lock mechanism to be released by pulling up the upper portion for folding the seat back forward; and a supporting element fixed to the escutcheon in the opening of the escutcheon along a width-wise direction of the strap, the supporting element interposed in the folded strap, the supporting element facing a same direction as the strap in a pulling-up direction.

2. A lock releasing structure of a seat back according to claim 1, wherein said strap has a pulling-up operation area, the pulling-up operation area has an upper and a lower end portion, said supporting element is between the upper and the lower end portion, and the upper and the lower end portion are sewn along said width-wise direction of the strap.

3. A lock releasing structure of a seat back according to claim 2, wherein said supporting element has an upper and a lower end surface, one of the upper and the lower end surface is curved.

4. A lock releasing structure of a seat back according to claim 1, wherein said supporting element has an upper and a lower end surface, one of the upper and the lower end surface is curved.

5. A lock releasing structure of a seat back, comprising:

a seat back to be folded;

a lock mechanism provided inside the seat back, the lock mechanism for the seat back to be locked thereby;

an escutcheon mounted to the seat back, the escutcheon having an opening therethrough;

a strap connected with the lock mechanism in the seat back, the strap having a projection outside the seat back through the opening of the escutcheon, the strap folded on an end of the projection, the strap for the lock mechanism to be released by pulling up the projection thereof; and a supporting element interposed in the folded strap, the supporting element fixed to the escutcheon in the opening of the escutcheon.

* * * * *